United States Patent
Hirata

(10) Patent No.: US 11,494,784 B2
(45) Date of Patent: Nov. 8, 2022

(54) EVALUATION INFORMATION GENERATION SYSTEM, EVALUATION INFORMATION GENERATION METHOD, AND PROGRAM

(71) Applicant: SKY Perfect JSAT Corporation, Tokyo (JP)

(72) Inventor: Daisuke Hirata, Tokyo (JP)

(73) Assignee: SKY Perfect JSAT Corporation, Tokyo (JP)

( * ) Notice: Subject to any disclaimer, the term of this patent is extended or adjusted under 35 U.S.C. 154(b) by 323 days.

(21) Appl. No.: 16/771,344

(22) PCT Filed: Dec. 28, 2017

(86) PCT No.: PCT/JP2017/047326
§ 371 (c)(1),
(2) Date: Jun. 10, 2020

(87) PCT Pub. No.: WO2019/130568
PCT Pub. Date: Jul. 4, 2019

(65) Prior Publication Data
US 2020/0349585 A1    Nov. 5, 2020

(51) Int. Cl.
*G06K 9/00* (2022.01)
*G06Q 30/00* (2012.01)
(Continued)

(52) U.S. Cl.
CPC ......... *G06Q 30/018* (2013.01); *G06Q 40/025* (2013.01); *G06T 7/174* (2017.01);
(Continued)

(58) Field of Classification Search
None
See application file for complete search history.

(56) References Cited

U.S. PATENT DOCUMENTS 10,395,355 B2 *  8/2019  Cohen ............... A01G 25/16
10,410,334 B2 *  9/2019  Cohen ............... G06N 5/04
(Continued)

FOREIGN PATENT DOCUMENTS

CN   106600434 A   4/2017
JP   2014-26507 A   2/2014
(Continued)

OTHER PUBLICATIONS

Examination Report issued in Indian Patent Application No. 202017026811 dated Oct. 20, 2021.
(Continued)

*Primary Examiner* — Soo Jin Park
(74) *Attorney, Agent, or Firm* — Marshall, Gerstein & Borun LLP

(57) ABSTRACT

The evaluation information generating system of the present invention evaluates a ground area owned by a user, using satellite data observed by an artificial satellite, and includes a user information acquisition unit that acquires user information that is personal information of the user, a ground area information acquisition unit that acquires ground area information including a position of the ground area, a satellite data acquisition unit that acquires the satellite data, a situation detection unit that detects a situation of the ground area based on the satellite data, and an evaluation data generating unit that generates evaluation data of the user or the ground area based on the user information, ground area information, and situation of the ground area.

16 Claims, 9 Drawing Sheets

(51) Int. Cl.
    *G06Q 40/02*     (2012.01)
    *G06T 7/174*     (2017.01)
(52) U.S. Cl.
    CPC ..... *G06K 9/00523* (2013.01); *G06K 9/00536* (2013.01); *G06T 2207/10032* (2013.01); *G06T 2207/10036* (2013.01); *G06T 2207/30188* (2013.01)

(56) References Cited

U.S. PATENT DOCUMENTS

| | | | |
|---|---|---|---|
| 10,748,081 B2 * | 8/2020 | Cohen | G06Q 50/02 |
| 2016/0292626 A1 | 10/2016 | Green et al. | |
| 2018/0330486 A1 * | 11/2018 | Cohen | G06V 10/751 |
| 2020/0051242 A1 * | 2/2020 | Stanley | G01S 17/89 |

FOREIGN PATENT DOCUMENTS

| | | | |
|---|---|---|---|
| JP | 2017049673 A | 3/2017 | |
| JP | 2017-169511 A | 9/2017 | |
| WO | WO-2017/164009 A1 | 9/2017 | |
| WO | WO-2017/217169 A1 | 12/2017 | |

OTHER PUBLICATIONS

International Search Report issued in PCT Patent Application No. PCT/JP2017/047326 dated Mar. 20, 2018.

\* cited by examiner

FIG.5

| BAND | CENTRAL WAVELENGTH | RESOLUTION |
|---|---|---|
| B1 | 443 nm | 60 m |
| B2 | 490 nm | 10 m |
| B3 | 560 nm | 10 m |
| B4 | 665 nm | 10 m |
| B5 | 705 nm | 20 m |
| B6 | 740 nm | 20 m |
| B7 | 775 nm | 20 m |
| B8 | 842 nm | 10 m |

AGRICULTURAL FIELD

EVALUATION INFORMATION GENERATION SYSTEM, EVALUATION INFORMATION GENERATION METHOD, AND PROGRAM

TECHNICAL FIELD

The present invention relates to an evaluation information generating system, an evaluation information generating method, and a program.

BACKGROUND ART

Access to finance is limited in developing countries in Southeast Asia and elsewhere due to a lack of objective evaluation data such as pay statements necessary for credit scoring by a financial institution. Farmers who are not allowed a loan from a financial institution have no option but to give up further agricultural investments, because of which they have no prospect of increase in harvest, and the vicious circle of poverty continues.

Techniques that enable asset evaluation of a debtor have been proposed in recent years. Japanese Patent Application Laid-open No. 2017-049673 discloses a technique that uses artificial intelligence to produce information on a customer's needs and risks based on the information of the customer's attributes, examination results or business deals.

However, this technique concerns the substitution of artificial intelligence for a task of experienced personnel in a financial institution, and farmers without data for evaluation were not the target.

SUMMARY OF THE DISCLOSURE

An object of the present invention accordingly is to provide a technique for generating objective data that allows evaluation of a ground area owned by a user.

The first aspect of the present invention is an evaluation information generating system that evaluates a ground area owned by a user, using satellite data observed by an artificial satellite, the system comprising:

a user information acquisition unit configured to acquire user information that is personal information of the user;

a ground area information acquisition unit configured to acquire ground area information including a position of the ground area;

a satellite data acquisition unit configured to acquire the satellite data;

a situation detection unit configured to detect a situation of the ground area based on the satellite data; and an evaluation data generating unit configured to generate evaluation data of the user or the ground area based on the user information, the ground area information, and the situation of the ground area.

According to this configuration, the evaluation data generating unit can generate objective evaluation data (objective data) of a ground area owned by a user. Here, a ground area owned by a user means an area containing an agricultural field or an ocean farm. "Owned by a user" does not necessarily mean the user himself/herself actually owning a land, but may mean a relative owning it, for example, or, the user being a supervisor of the area such as an agricultural field.

In the present invention, the ground area information may be acquired by a person moving around the outer periphery of the ground area, using a terminal equipped with a satellite positioning system. The ground area information acquisition unit can readily acquire the position of the ground area by obtaining ground area information using a satellite positioning system such as GPS or GNSS, in some embodiments.

In the present invention, the situation detection unit can detect a situation of the ground area based on the image data generated based on the satellite data. Here, a situation of the ground area refers to information of the ground such as water sources, soil, vegetation, etc., temperatures of the ground surface, temperatures of the sea surface, altitudes of the ground level, cloud conditions, etc., and time series information of these.

In the present invention, the ground area may be an agricultural field, and the situation detection unit detects at least one of water, soil, or vegetation as the situation based on the image data, and generates maps that show distributions of respective situations. By generating such maps, the situation detection unit can detect accessibility (distance) to a water source from an agricultural field owned by the user, in some embodiments. By aligning the maps in time series order, the situation detection unit can determine whether or not double cropping is being practiced based on the number of transitions from soil to vegetation in one year. An indication of a "short distance to a water source", for example, is utilized for generation of evaluation data, as it may earn a high rating as an agricultural field with abundant water, while it also entails a risk of a natural disaster such as flooding.

In the present invention, the evaluation information generating system may include a meteorological data acquisition unit that acquires meteorological data, and the evaluation data generating unit generates evaluation data of the user or the ground area based on the meteorological data, the user information, the ground area information, and the situation of the ground area. This enables calculation of a degree of certainty of the information declared by the user as well as objective evaluation of the ground area. In some embodiments, if the user declares practice of double cropping, the degree of certainty of this declared content as user information can be calculated, because whether or not double cropping is being practiced can be determined from the temporal change of image data generated from satellite data. In some embodiments, objective evaluation of a ground area refers to, rating by agricultural field scores (evaluation values) obtained by [agricultural field area]×[average harvest]×[average crop price]×[number of crops (double cropping or not)].

In the present invention, the evaluation data generating unit may generate the evaluation data using an artificial intelligence algorithm (such as machine learning). For example, classifiers created through use of a machine learning algorithm may be used to determine whether or not the situation of the vegetation is normal or abnormal based on the image data in time series order generated from satellite data, and if it is abnormal, evaluation data indicating it as a risk at the agricultural field may be generated. The learning algorithm is not limited to a particular type and any suitable algorithm may be adopted. Deep learning, SVM, and other algorithms may be used in some embodiments.

The second aspect of the present invention is an evaluation information generating method that evaluates a ground area owned by a user, using satellite data observed by an artificial satellite, the method including:

a user information acquisition step of acquiring user information that is personal information of the user;

a ground area information acquisition step of acquiring ground area information including a position of the ground area;

a satellite data acquisition step of acquiring the satellite data;

a situation detection step of detecting a situation of the ground area based on the satellite data; and an evaluation data generating step of generating evaluation data of the user or the ground area based on the user information, the ground area information, and the situation of the ground area.

The third aspect of the present invention is a program for causing a computer to execute each step of the method described above.

The present invention can be understood as an evaluation information generating system having at least part of the configuration described above. The present invention can also be understood as any of an evaluation information generating method or a ground map generating method including at least some of the process steps described above, or a program for causing a computer to execute such methods and a computer-readable storage medium containing this program permanently stored therein. Various features of the configuration and process steps described above may be combined with each other to construct the present invention as long as they do not technically contradict each other.

According to the present invention, objective data for evaluating a ground area owned by a user can be generated.

BRIEF DESCRIPTION OF DRAWINGS

FIG. 5 is a flowchart showing one example of satellite data according to the embodiment.

DETAILED DESCRIPTION OF EMBODIMENTS

Embodiment

Hereinafter, one embodiment of the present invention will be described.

The evaluation information generating system according to this embodiment generates objective evaluation data of a user and an agricultural field, using ground data relating to the agricultural field (ground area) owned by the user and satellite data observed by an artificial satellite. The generated evaluation data is used as credit information, for example, when a financial institution grants a loan to the user. In this embodiment, a user's terminal, a terminal of an information collector who supervises the agricultural field owned by the user, and a server device are used to generate the evaluation data. Hereinafter, the system configuration of the evaluation information generating system, the ground area information acquisition process, and the evaluation information generating process according to this embodiment will each be described in turn.

<System Configuration>

Figure 1:
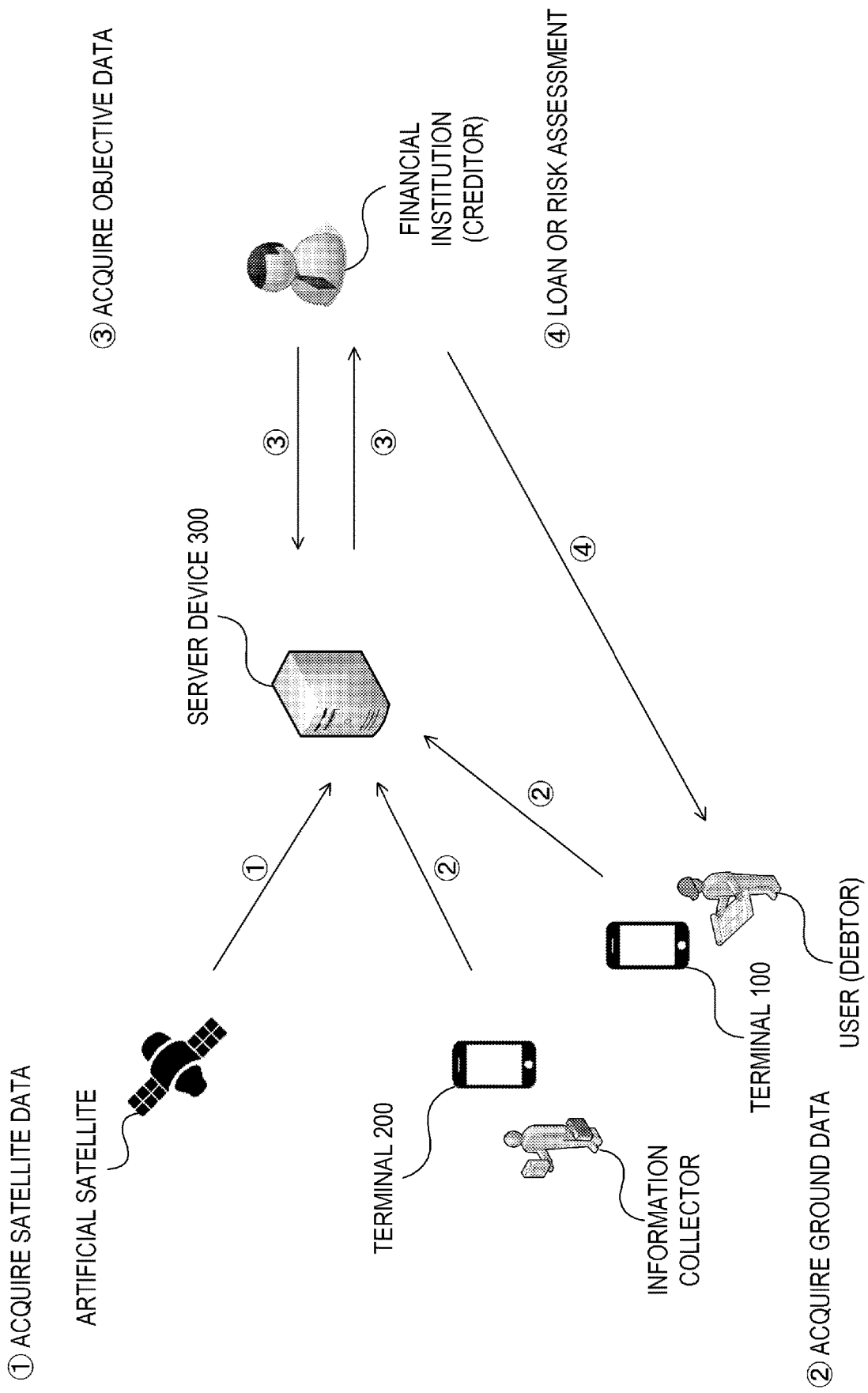
FIG. 1 is a diagram illustrating an overview of the system of one embodiment.

FIG. 1 is a diagram illustrating an overview of the system of this embodiment. The evaluation information generating system according to this embodiment is constituted by a terminal 100 owned by a user, a terminal 200 owned by an information collector, a server device 300, etc., that can communicate with each other via a network.

Figure 2:
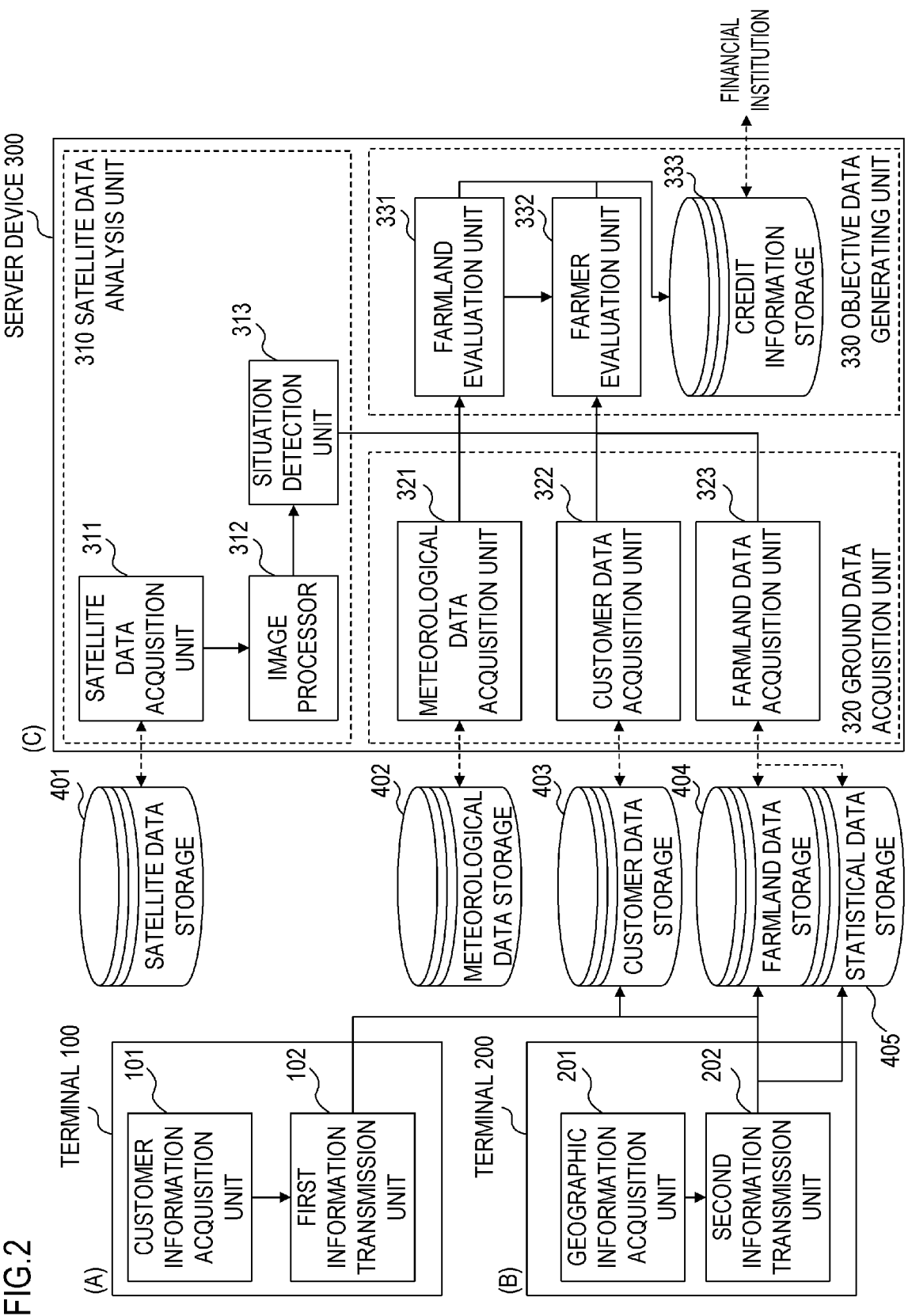
FIG. 2 is a functional block diagram of the evaluation information generating system according to the embodiment.

FIG. 2 is a diagram of functional blocks in each device of the evaluation information generating system according to the embodiment.

The terminal 100 is an information processor (computer) including a processing device (processor), a memory, a storage device, an input/output device, and so on. A program stored in the storage device is executed on the terminal 100, whereby functions such as a customer information acquisition unit 101, a first information transmission unit 102, etc., are provided. Some or all of these functions may be implemented by a dedicated logic circuit such as ASIC or FPGA. In this embodiment, one example will be described wherein an information device such as a smartphone and the like owned by the user is used as the terminal 100. Hereinafter, the terminal 100 shall be referred to as "user terminal 100".

The terminal 200 is an information processor (computer) including a processing device (processor), a memory, a storage device, an input/output device, and so on. A program stored in the storage device is executed on the terminal 200, whereby functions such as a geographic information acquisition unit 201, a second information transmission unit 202, etc., are provided. Some or all of these functions may be implemented by a dedicated logic circuit such as ASIC or FPGA. In this embodiment, an information device such as a smartphone and the like owned by an information collector is used as the terminal 200. Hereinafter, the terminal 200 shall be referred to as "information collector terminal 200".

The server device 300 is an information processor (computer) including a processing device (processor), a memory, a storage device, an input/output device, and so on. A program stored in the storage device is executed on the server device 300, whereby functions such as a satellite data analysis unit 310, a ground data acquisition unit 320, an objective data generating unit 330, etc., are provided. The satellite data analysis unit 310 is constituted by a satellite data acquisition unit 311, an image processor 312, a situation detection unit 313, and so on. The ground data acquisition unit 320 is constituted by a meteorological data acquisition unit 321, a customer data acquisition unit 322, a farmland data acquisition unit 323, and so on. The objective data generating unit 330 is constituted by a farmland evaluation unit 331, a farmer evaluation unit 332, a credit information storage 333, and so on. Some or all of these functions may be implemented by a dedicated logic circuit such as ASIC or FPGA.

In this embodiment, the server device 300 acquires various data from an external storage device such as a cloud storage. The external storage device is equipped with storages such as a satellite data storage 401, a meteorological data storage 402, a customer data storage 403, a farmland data storage 404, a statistical data storage 405, and so on. The data in the storages may be separately recorded in a plurality of external storage devices. Alternatively, the storages may be provided inside the server device 300.

(User Terminal 100)

The customer information acquisition unit 101 (user information acquisition unit) is a functional unit that acquires personal information such as the name, age, house ownership, family configuration, etc., and history information and the like, of the user. The customer information acquisition unit 101 obtains information input by the user using an application installed on the user terminal 100, for example.

The first information transmission unit 102 is a functional unit that transmits the information to an external storage device via wireless communication in response to the user's instruction to do so. The information sent by the first information transmission unit 102 includes the customer information acquired by the customer information acquisition unit 101. In this embodiment, the first information transmission unit 102 sends part of the customer information 10 in the format shown in FIG. 3(A). The transmitted customer information is recorded in the customer data storage 403. In this embodiment, the customer information at least includes the user's identification information. While the first information transmission unit 102 sends the information in response to the user's instruction to do so in this embodiment, the unit may transmit the information in response to an acquisition of the customer information.

The customer information 10 is the information of a user who owns an agricultural field (user information), and includes user's name 11, age 12, house ownership 13, family configuration 14, past loan history 15, behavioral history 16, and so on. The name 11, age 12, house ownership 13, and family configuration 14 are personal information for identifying the user. This personal information is also used for cross-checking the information kept by a public institution. The past loan history 15 is the information for determining whether the user is currently getting or has obtained a loan from a financial institution in the past or a new customer. The behavioral history 16 is the position information obtained from a device such as the user terminal 100 using a satellite positioning system such as global positioning system (GPS) or global navigation satellite system (GNSS) and the like. The house ownership is whether or not the user himself/herself owns a house in this embodiment, but the entity that owns the house may be other than the user. For example, the house ownership may indicate whether or not a family member or a relative of the user owns a house. The customer information 10 is not limited to the items listed above and may contain any applicable information.

(Information Collector Terminal 200)

The geographic information acquisition unit 201 is a functional unit that acquires agricultural field information such as the position, area and the like of the agricultural field owned by the user, and statistical data. The geographic information acquisition unit 201 acquires, for example, information obtained by the information collector through positioning using a global positioning system installed on the information collector terminal 200, or information input by the information collector using an application.

The second information transmission unit 202 is a functional unit that transmits information to an external storage device via wireless communication in response to an instruction by the information collector to do so. The information sent by the second information transmission unit 202 includes the agricultural field information acquired by the geographic information acquisition unit 201. In this embodiment, the second information transmission unit 202 sends part of the agricultural field information 20 and statistical data 30 in the formats shown in FIG. 3(B) and FIG. 3(C) respectively. The transmitted agricultural field information 20 and statistical data 30 are recorded in the farmland data storage 404 and the statistical data storage 405, respectively. In this embodiment, the agricultural field information 20 at least includes the position information of the agricultural field. While the second information transmission unit 202 sends the information in response to the information collector's instruction to do so in this embodiment, the unit may transmit the agricultural field information 20 in response to an acquisition of the information.

The agricultural field information 20 includes the position of the agricultural field 21, area of the agricultural field 22, cultivated crop 23, crop type 24, flooding risk 25, accessibility to water sources 26, double cropping or not 27, amount of agrichemicals and fertilizers 28, use of farm equipment 29, and so on, as the information on the agricultural field owned by the user.

The position of the agricultural field 21 is the position information acquired by the information collector using a satellite positioning system, such as, for example, information indicative of the latitude and longitude of the agricultural field. In this embodiment, the position information is the information indicative of a plurality of positions obtained at predetermined intervals by the information collector moving around the outer periphery (circumference) of the agricultural field using the information collector terminal 200. It may instead be information indicative of the position of a part of the agricultural field. The area of the agricultural field 22 is the information indicative of the size of the agricultural field owned by the user. The area of the agricultural field 22 may either be input by the information collector via an application on the information collector terminal 200, for example, or may be calculated by the information collector terminal 200 based on the position of the agricultural field described above. The cultivated crop 23 and crop type 24 are the information regarding the crop cultivated at the agricultural field owned by the user. The flooding risk 25, accessibility to water sources 26, and double cropping or not 27 are agricultural field information input by the information collector in this embodiment. The number of agrichemicals and fertilizers 28 is the information about the agrichemicals or fertilizers used in the agricultural field and input by the information collector. The use of farm equipment 29 is the information indicative of presence or absence of farm equipment owned by the user, either input by the information collector or determined from a device installed on the farm equipment. The agricultural field information 20 is not limited to the items listed above and may be any applicable information.

(Statistical Data 30)

The statistical data 30 includes average crop price 31, average harvest 32 and the like, as the information on a predetermined area. The average crop price 31 and average harvest 32 indicate statistical information for each predetermined area. Such statistical data may be information input by the information collector, or information acquired from a public institution. The statistical data 30 is not limited to the items listed above and may be any applicable information.

(Server Device 300)

<<Satellite Data Analysis Unit 310>>

The satellite data analysis unit 310 is a functional unit that detects the conditions near the surface of the earth based on satellite data by means of the functional units such as the satellite data acquisition unit 311, image processor 312, situation detection unit 313, and so on. While the target of analysis by the satellite data analysis unit 310 is the presence or absence of water sources, soil, and vegetation on the ground in this embodiment, the analysis targets may be the temperatures of the ground surface, temperatures of the sea surface, altitudes of the ground level, cloud conditions, etc. Various functional units of the satellite data analysis unit 310 will be described below.

The satellite data acquisition unit 311 is a functional unit that acquires satellite data observed by an artificial satellite from the satellite data storage 401. In this embodiment, the satellite data acquisition unit 311 acquires satellite data obtained by an optical satellite or a synthetic aperture radar (SAR) satellite specifically, among the satellite data recorded in the external storage device. The satellite data includes ultraviolet light, infrared light, microwaves and the like, with wavelengths other than those of visible light that is visible to the human eye.

Figure 4:
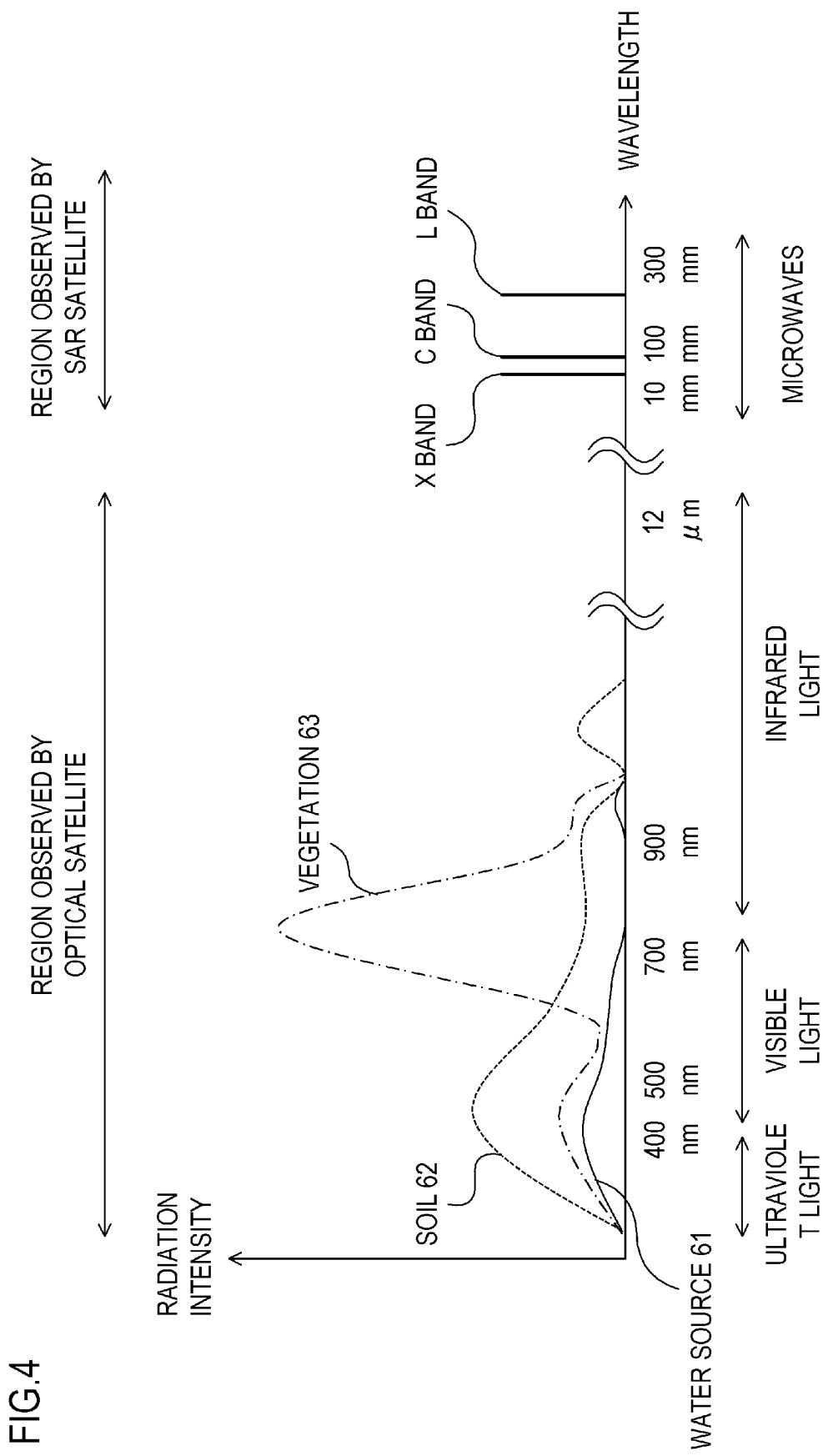
FIG. 4 is a flowchart showing one example of satellite data according to the embodiment.

FIG. 4 is a diagram showing one embodiment of satellite data acquired by the satellite data acquisition unit 311. The satellite data acquisition unit 311 obtains radiations such as ultraviolet light, visible light, infrared light and the like observed by the optical satellite, and microwaves and the like observed by the SAR satellite. While the condition of the agricultural field is detected based on the satellite data obtained from the optical satellite and SAR satellite in this embodiment, the condition of the agricultural field may be detected based on other suitable remote sensing measurements.

Figure 3:
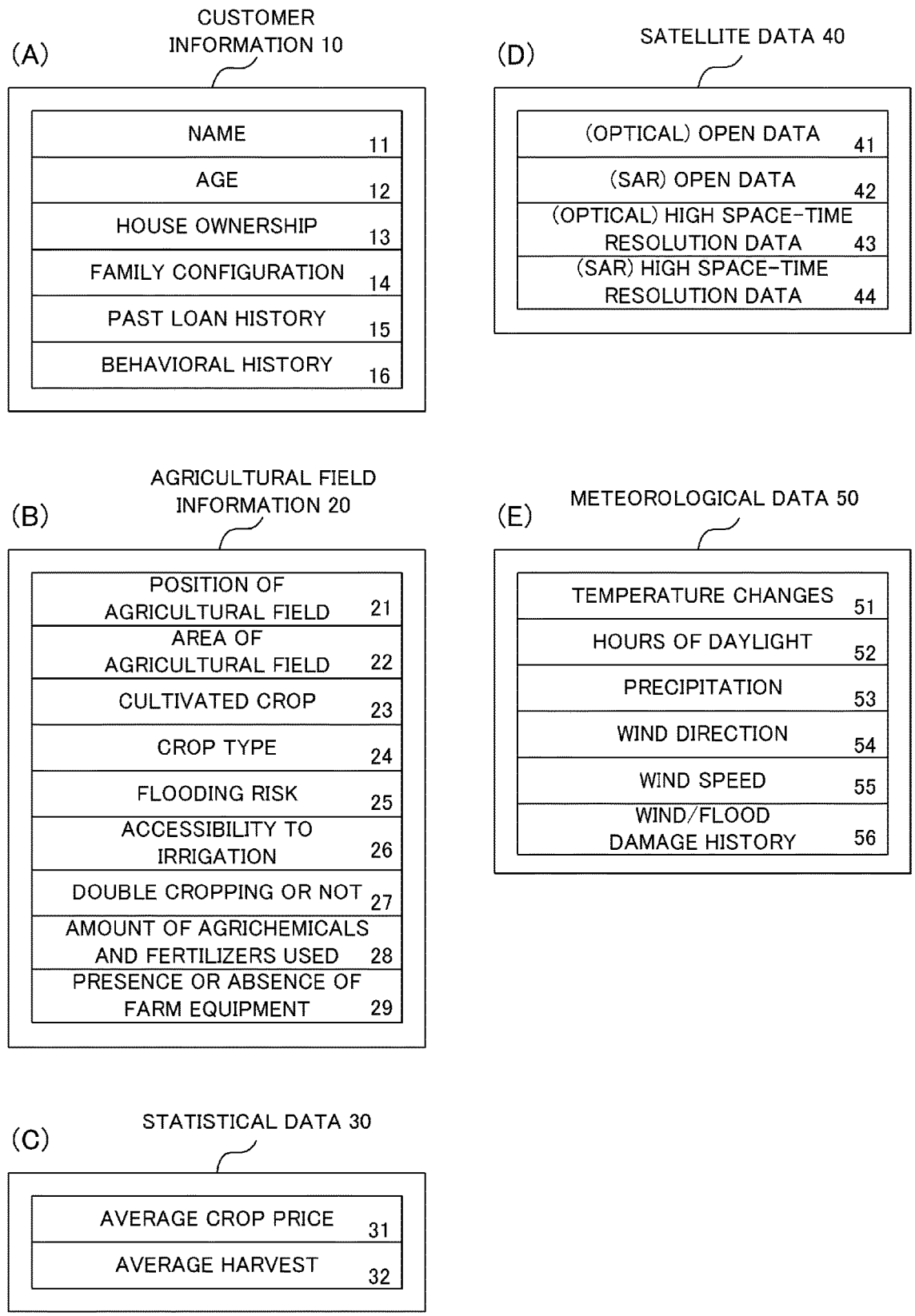
FIG. 3 is a diagram illustrating examples of data formats of various data according to the embodiment.

FIG. 3(D) illustrates satellite data 40 according to this embodiment. The satellite data 40 includes (optical) open data 41 and (SAR) open data provided by a space institution, and (optical) high space-time resolution data 43 and (SAR) high space-time resolution data 44 (higher, not only in spatial resolution, but also in temporal resolution due to high-frequency imaging, than open data) provided by a non-public cooperation.

The image processor 312 is a functional unit that converts the satellite data into image and generates ground image data. In this embodiment, the image processor 312 generates image data for detecting water sources 61, soil 62, and vegetation 63 shown in FIG. 4 based on several different spectral bands of electromagnetic waves picked up by the sensors of the optical satellite.

The normalized difference vegetation index (NDVI) is a typical known vegetation indicator used for determining the distribution of vegetation based on satellite data. The NDVI is an index developed to determine the distribution of vegetation with a simple calculation formula (following formula (1)) using satellite data based on the characteristics of light reflected by plants.

[Math. 1]

$$NDVI = (IR-R)/(IR+R) \qquad (1)$$

Here, IR and R represent a near-infrared wavelength and a visible light wavelength (orange), respectively. While vegetation is highlighted in the image data produced using the NDVI, it is difficult to identify a water source or soil, or distinguish transitions from vegetation to soil and soil to vegetation, as in different steps of rice cultivation process, because of limited tones of color representable in the image data.

In this embodiment, the image processor 312 generates image data that highlights water sources 61, soil 62, and vegetation 63.

FIG. 5 shows examples of various spectral bands in satellite data used in image processing of this embodiment. The image processor 312 performs image processing wherein it combines components of wavelengths from each spectral band to achieve a highest resolution (spatial resolution) possible for detection of water sources 61, soil 62, and vegetation 63. The image processor 312 combines wavelength components to generate image data separately for water sources 61, soil 62, and vegetation 63. More specifically, the image processor 312 uses spectral bands B3, B4, B5 and B8 shown in FIG. 5 to generate image data for detecting water sources 61, soil 62, and vegetation 63 by the combining method represented by the following formula (2).

[Math. 2]

$$\begin{cases} \text{Water source 61:} & \alpha \times (B3 - B8)/(B3 + B8) \\ \text{Soil 62:} & \beta \times (B4 - B8)/(B4 + B8) \\ \text{Vegetation 63:} & \gamma \times (B3 - B5)/(B3 + B5) \end{cases} \qquad (2)$$

Here, $\alpha$, $\beta$, and $\gamma$ are coefficients for adjusting the shades of respective colors. While the image processor 312 in this embodiment performs image processing using different spectral bands for each of the objects to be detected mentioned above, the image processing may be performed based on other suitable indices such as the NDVI, green and red ratio vegetation index (GRVI), soil adjusted vegetation index (SAVI), enhanced vegetation index (EVI), leaf area index (LAI), and others.

The situation detection unit 313 detects the situation on the ground using the image data obtained after the image processing described above. In this embodiment, maps indicating respective distributions of water sources 61, soil 62, and vegetation 63 are created from the image data generated by the image processing.

Figure 6:
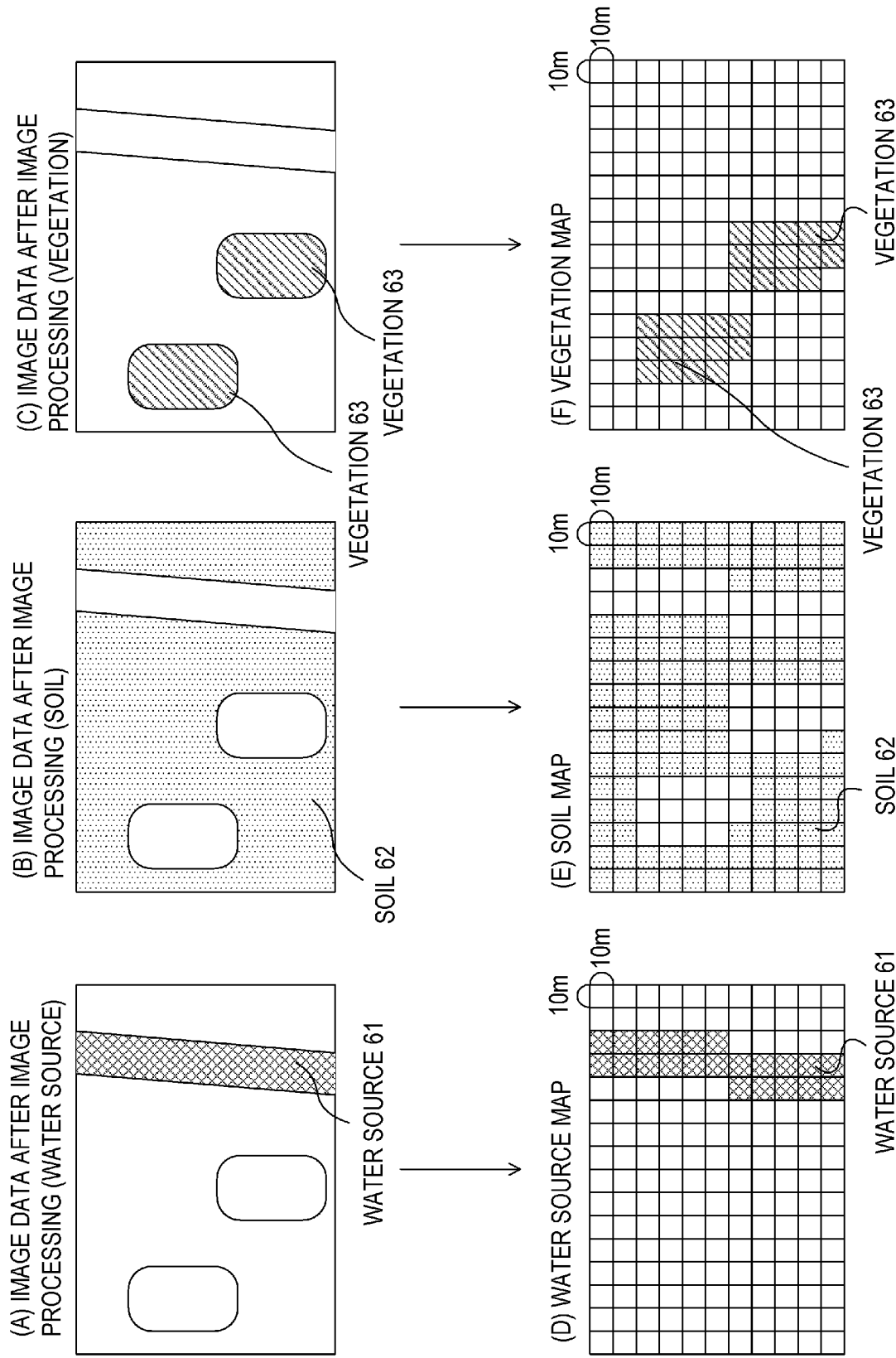
FIG. 6 is a diagram illustrating examples of maps generated by a situation detection unit according to the embodiment.

FIG. 6(A) shows image data (water sources) after the image processing. In this embodiment, the situation detection unit 313 creates a map constituted of 10 m×10 m size grid regions, and performs mapping based on the image data after the image processing. FIG. 6(D) is a diagram illustrating grid regions corresponding to a water source 61 with hatching. The situation detection unit 313 in this embodiment performs mapping of regions corresponding to a water source 61 when it determines that 50% of each grid region is taken up by the water source 61, but the determination method is not particularly limited to this.

Similarly, the situation detection unit 313 performs mapping based on the image data (of soil) after the image processing shown in FIG. 6(B) to create a soil map shown in FIG. 6(E). The situation detection unit 313 also performs mapping based on the image data (of vegetation) after the image processing shown in FIG. 6(C) to create a vegetation map shown in FIG. 6(F). While the situation detection unit 313 uses a map constituted 10 m×10 m size grid regions in this embodiment, the size and shape of grid regions are not particularly limited to this. For example, the map may be changed to a map constituted 3 m×3 m grid regions or the like depending on the resolution of the satellite data. While one of water sources 61, soil 62, and vegetation 63 is present in the image data in this embodiment, there may be regions identified as other than these.

<<Ground Data Acquisition Unit 320>>

The meteorological data acquisition unit 321 is a functional unit that acquires meteorological data from the meteorological data storage 402. In this embodiment, the meteorological data acquisition unit 321 acquires meteorological data including the meteorological data 50 shown in FIG. 3(E) recorded in the meteorological data storage 402. FIG. 3(E) shows the meteorological data 50 associated with this embodiment.

The meteorological data 50 is the meteorological data observed by a common meteorological observation system and includes temperatures 51, hours of daylight 52, precipitation 53, wind direction 54, wind speed 55, wind/flood damage history 56, and so on. The meteorological data 50 is not limited to the items listed above and may be any applicable information. Optionally, data acquired from sensors installed in a smartphone or farm equipment may be used as the meteorological data.

The customer data acquisition unit 322 is a functional unit that acquires customer data including the customer information 10 recorded in an external device.

The farmland data acquisition unit 323 is a functional unit that acquires farmland data including the agricultural field information 20 and statistical data including the statistical data 30 recorded in an external device.

<<Objective Data Generating Unit 330 (Evaluation Data Generating Unit)>>

The farmland evaluation unit 331 is a functional unit that evaluates an agricultural field based on the satellite data and the ground data. In this embodiment, the farmland evaluation unit 331 verifies the agricultural field information and evaluates the agricultural field based on the various information described above.

The farmland evaluation unit 331 verifies the agricultural field information by comparing the ground data such as the position of the agricultural field 21, area of the agricultural field 22, accessibility to water sources 26, double cropping or not 27, etc., with the image data obtained based on the satellite data. For example, the farmland evaluation unit 331 determines whether or not double cropping is being practiced from temporal change of image data based on the satellite data. For example, if the farmland evaluation unit 331 detects a transition from soil to vegetation in the agricultural field twice or more in one year based on the temporal change of image data, the farmland evaluation unit determines that double cropping is being practiced. In another example, the farmland evaluation unit 331 determines the frequency of visits by the user to the agricultural field from the position information in the behavioral history 16, to decide whether or not the agricultural field is a land owned by the user. More specifically, if the user's behavioral history 16 indicates user visits to the agricultural field within a predetermined period, the farmland evaluation unit 331 determines that the position of the agricultural field is correct.

In this embodiment, the farmland evaluation unit 331 evaluates the agricultural field by the agricultural field score obtained by the following formula (3).

[Math. 3]

$$[\text{Agricultural field score}] = a \times [\text{Agricultural field area 22}] \times \\ b \times [\text{Average harvest 32}] \times \\ c \times [\text{Average crop price 31}] \times \\ d \times [\text{Double cropping or not 27 (number of crops)}] \quad (3)$$

Here, a, b, c, and d are coefficients for adjusting the weight of respective parameters. The weight to each piece of the information can be changed depending on the financial institution or the like that consults the credit information. Meteorological data or other information may be used as items for correcting the agricultural field score obtained by formula (3) above when calculating the agricultural field score. The agricultural field score based on formula (3) above is just one example and the farmland evaluation unit 331 may generate evaluation data by any combination of information. The farmland evaluation unit 331 may produce credibility scores additionally as part of the evaluation data if the verification results mentioned above contradict the agricultural field information.

The farmer evaluation unit 332 is a functional unit that evaluates a farmer (user) based on the satellite data and the ground data. In this embodiment, the farmer evaluation unit 332 conducts an evaluation by comparing the customer information (ground data) such as expenses, incomes and the like declared by the user with an income estimated from the agricultural field score described above. In the land where there is no registry book, the user's incomes and expenses are determined only based on the user's declaration. The farmer evaluation unit 332 generates objective evaluation data by comparing the declared contents (ground data) with the data based on the satellite data. For example, an estimated income is calculated by summing up the agricultural field scores described above of the past twelve months. The farmer evaluation unit 332 may generate evaluation data by any combination of information.

The credit information storage 333 is a functional unit that records credit information (objective data or evaluation data) output by the farmland evaluation unit 331 and farmer evaluation unit 332 described above. The credit information storage 333 may produce scores calculated by weighting various information for each financial institution. The credit information storage 333 may be provided in an external device such as a cloud storage or the like.

<Ground Area Information Acquisition Process>

Figure 7:
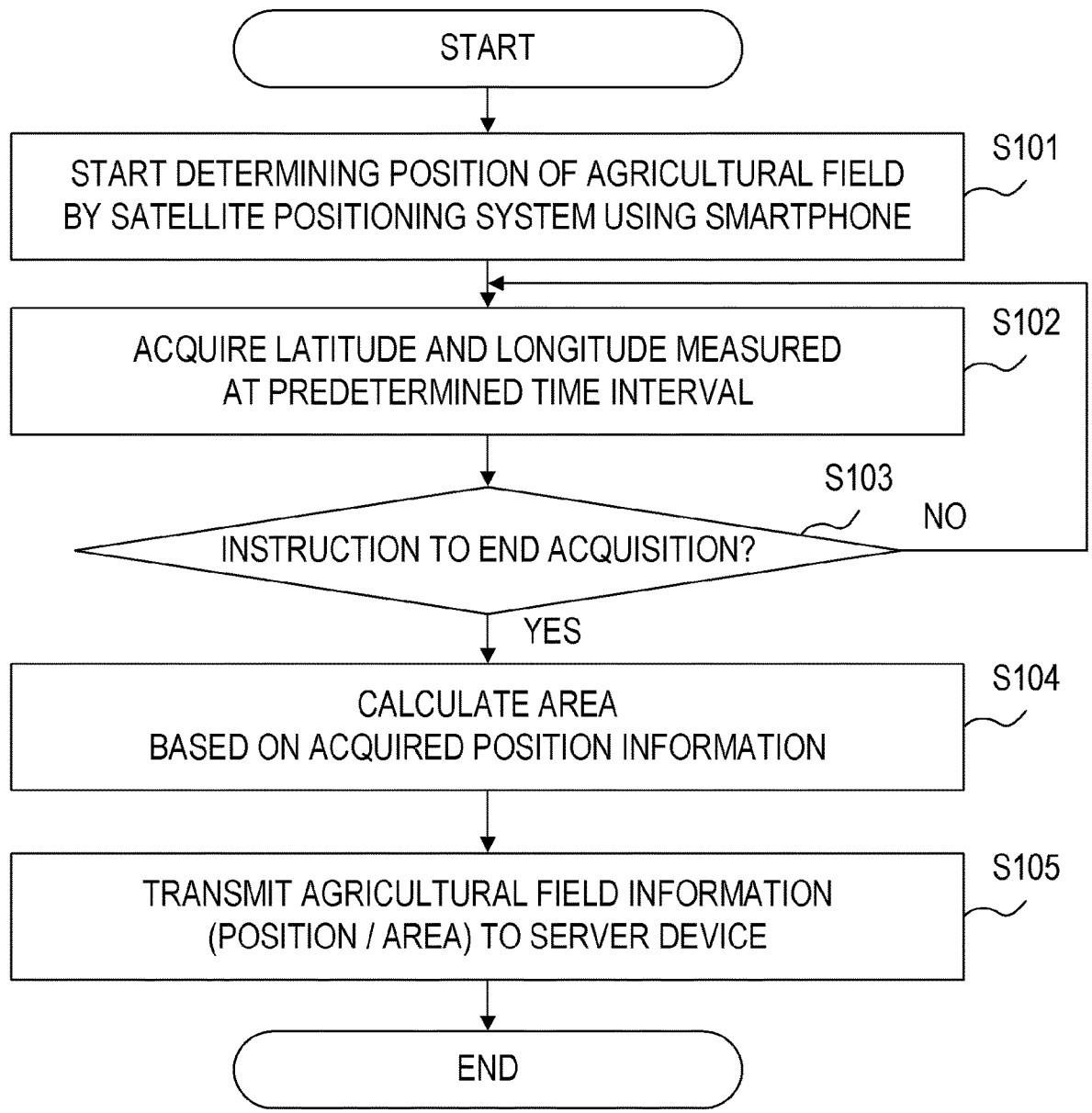
FIG. 7 is a flowchart showing one example of an agricultural field information acquisition process according to the embodiment.

The ground area information acquisition process according to this embodiment will be described with reference to the flowchart of FIG. 7. In this embodiment, the information such as the position and the like of the agricultural field is acquired using the information collector terminal 200 (e.g., smartphone). The information collector determines the position of the agricultural field at the agricultural field owned by the user using a satellite positioning system. More specifically, the information collector moves around the outer periphery of the agricultural field, and, during this time, the positions of the information collector terminal 200 are acquired at predetermined time intervals by means of the satellite positioning system of the information collector terminal 200. The information collector terminal 200 then sends the acquired information of one or more positions to the server device 300 as the agricultural field information.

At step S101, the geographic information acquisition unit 201 starts determining the position of the agricultural field by a satellite positioning system in response to an instruction from the information collector.

Figure 8:
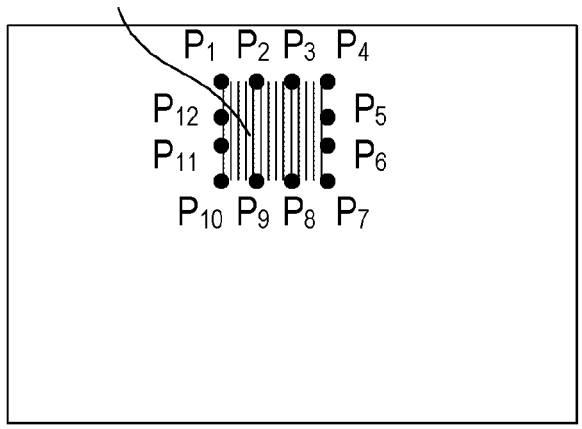
FIG. 8 is a diagram showing one example of an agricultural field information acquisition method according to the embodiment.

At step S102, the geographic information acquisition unit 201 acquires position information at predetermined time intervals. In this embodiment, the geographic information acquisition unit 201 acquires position information represented by $P_1$ to $P_{12}$ in FIG. 8 using the satellite positioning system of the information collector terminal 200 during the time when the information collector moves around the outer periphery of the agricultural field. While the position information is acquired at a predetermined equal time interval in this embodiment, the timing at which the position information is acquired is not particularly limited to this. The number of positions and the shape of the agricultural field are not limited particularly. The geographic information acquisition unit 201 may acquire position information each time when the information collector gives an instruction.

At step S103, the geographic information acquisition unit 201 determines whether or not an instruction has been given by the information collector to end acquisition of the information. If it determines that no instruction has been given to end acquisition (S103: NO), step S102 is performed. If it determines that the instruction has been given to end acquisition (S103: YES), the process goes to step S104.

At step S104, the geographic information acquisition unit 201 calculates the area of the agricultural field based on the position information acquired at step S102. In this embodiment, the geographic information acquisition unit 201 calculates the area of the region surrounded by a track obtained by connecting the positions $P_1$ to $P_{12}$ acquired by the information collector terminal 200. The method of calculating the area is not limited particularly. The area (S) may be determined by formula (4), for example, using the coordinates $P_i(x_i, y_i)$ in the position information.

[Math. 4]
$$S = \frac{1}{2}\left|\sum_{i=1}^{n}(x_i \times y_{i+1} - x_{i+1} \times y_i)\right| \quad (4)$$

Here, n represents the number of positions. When i=n, n+1=0. The vertical hatching in FIG. 8 indicates the agricultural field (area) acquired by the geographic information acquisition unit 201 in this embodiment.

At step S105, the second information transmission unit 202 transmits the acquired agricultural field information (including the position and area) to the server device 300. The second information transmission unit 202 may transmit the position information to the server device 300 every time it acquires position information.

<Evaluation Information Generating Process>

Figure 9:
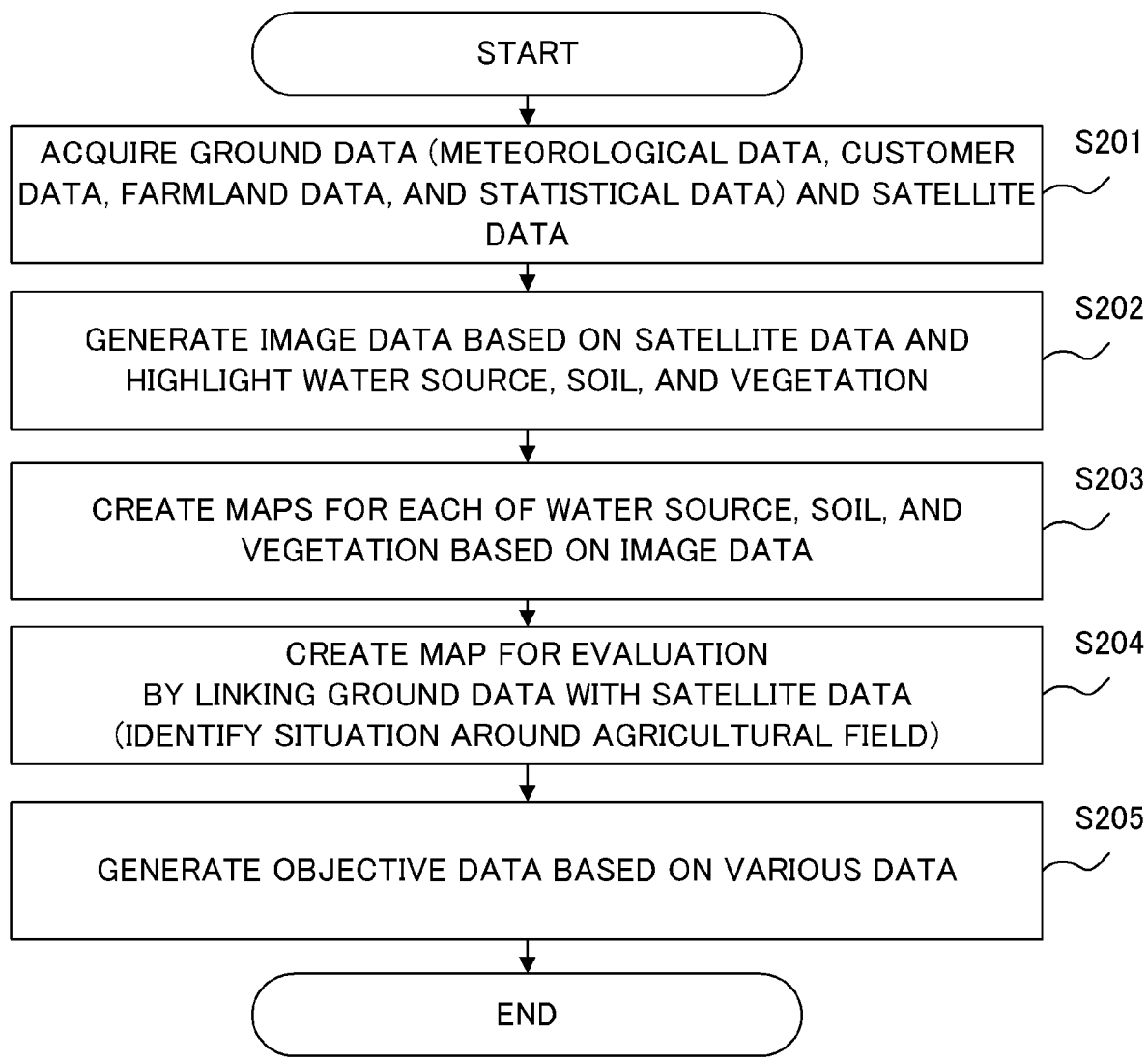
FIG. 9 is a flowchart showing one example of an evaluation information generating process according to the embodiment.

The evaluation information generating process according to this embodiment will be described with reference to the flowchart of FIG. 9.

At step S201, the satellite data acquisition unit 311 acquires the satellite data 40. The meteorological data acquisition unit 321 acquires the meteorological data 50. The customer data acquisition unit 322 acquires the customer data 10. The farmland data acquisition unit 323 acquires the agricultural field information 20 and statistical data 30.

At step S202, the image processor 312 generates image data based on the satellite data. More specifically, the image processor 312 generates separate image data each highlighting water sources, soil, and vegetation from the spectral bands in the satellite data using formula (2) described above.

At step S203, the situation detection unit 313 generates maps that indicate distributions of the water sources 61, soil 62, and vegetation 63 shown in FIG. 6(D), FIG. 6(E), and FIG. 6(F) respectively based on the image data after the image processing described above.

Figure 10:
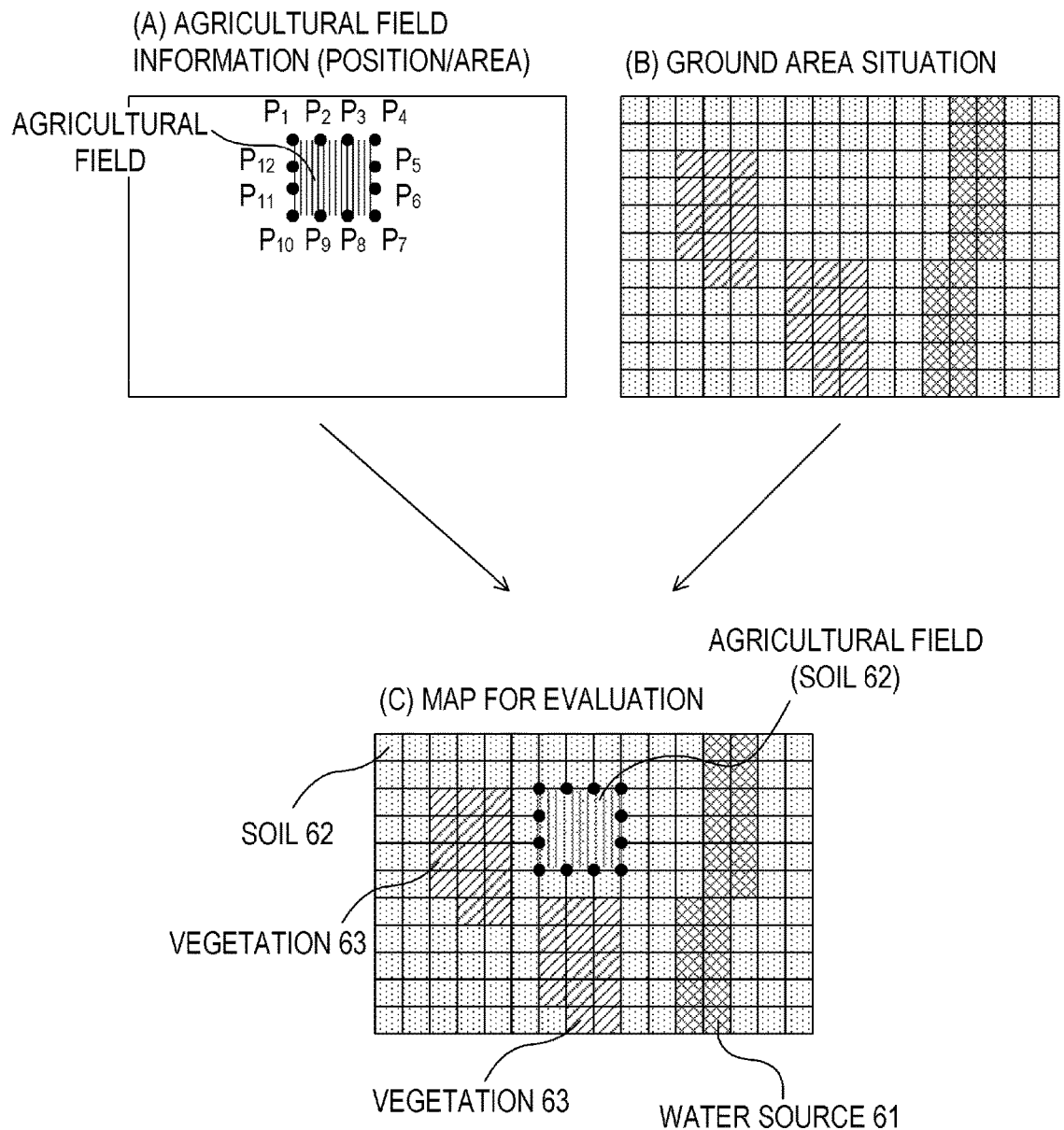
FIG. 10 is a diagram showing one example of the linking of agricultural field information with situations of the ground area according to the embodiment.

At step S204, the farmland evaluation unit 331 links the maps with the agricultural field information (e.g., position and area) to identify the situation of the user's agricultural field (ground area). In this embodiment, the farmland evaluation unit 331 links the agricultural field information (e.g., position and area) shown in FIG. 10(A) with the situation of the ground area shown in FIG. 10(B) and generates a map to be used for evaluation shown in FIG. 10(C) to identify the situation of the user's agricultural field. This way, for example, the farmland evaluation unit 331 can identify the situation of the agricultural field shown in FIG. 10(C) as "soil".

At step S205, the farmland evaluation unit 331 evaluates the farmland of the agricultural field using the ground data such as the meteorological data, customer data, farmland data and the like, and the aforementioned map for evaluation. For example, the farmland evaluation unit 331 evaluates the agricultural field by obtaining an agricultural field score shown in formula (3) described above. The farmer evaluation unit 332 generates evaluation data of the user (farmer). For example, the farmer evaluation unit 332 calculates an estimated income of the user by summing up the agricultural field scores described above of the past twelve months.

Advantageous Effects of this Embodiment

The evaluation information generating system according to this embodiment can generate evaluation data that is objective data of a user or an agricultural field based on satellite data and ground data for an agricultural producer in a developing country who does not possess objective data such as pay statements or the like. Since the position of the agricultural field is identified using a terminal or the like with a satellite positioning system installed thereon, the agricultural fields of discrete users can be specified correctly.

Variation Examples

While the evaluation information generating system generates evaluation data by means of the farmland evaluation unit 331 and farmer evaluation unit 332 in the embodiment described above, the evaluation data may be generated using an artificial intelligence algorithm such as machine learning. For example, classifiers created through use of a machine learning algorithm may be used to determine whether or not the situation of the vegetation is normal or abnormal based on the image data in time series order generated from satellite data, and if it is abnormal, evaluation data indicating it as a risk at the agricultural field may be generated. The learning algorithm is not limited to a particular type and any suitable algorithm may be adopted. Deep learning, SVM, and other algorithms may be used in some embodiments.

While one example was described in the foregoing embodiment wherein credit information used for financing by a financial institution is generated as evaluation data, the evaluation data is not limited to credit information. For example, the evaluation data may be information necessary for risk assessment of a person applying for or claiming on an insurance, or for a decision of debt collection.

As one example relating to an insurance, various data may be used for assessing flooding risk of the area where the agricultural field is located when the owner takes out insurance, or as the proof of negligence or a lack of it when the owner makes insurance claims.

As one example of a decision of debt collection, the creditor can determine whether or not it is a good time for debt collection by detecting a harvest time at the debtor's agricultural field. A condition suited for debt collection refers to a situation where there are sufficient financial assets which may be determined, for example, by interpreting the timing at which the vegetation of the agricultural field changed to soil, based on satellite data, to be the harvest time.

While the evaluation data is generated based on the satellite data and ground data in the described above, alert information directly acquired from the information collector's terminal may be used in addition to the data mentioned above to generate the evaluation data. In this case, the evaluation information generating system can also generate credibility scores (evaluation data) based on the alert information.

Instead of both the user and the information collector sending ground data using different terminals as in the embodiment described above, either one of the user and the information collector may transmit the ground data. When transmitting ground data using different terminals, both the user and the information collector may send any information as required. Three or more terminals may be used to perform (three or more people may perform) the process described above.

While the position of the ground area is measured using a satellite positioning system of a smartphone in the example described above, the position may be determined using other terminals than the smartphone (e.g., wearable terminals), farm machinery equipped with a satellite positioning system, or other machines such as a drone (unmanned aircraft) that can be remote-controlled to fly (move). Also, such measurement need not necessarily be made by on-site human operation but may be made by a machine such as a self-controlled drone that can interact with the user as it moves.

The satellite data storage, meteorological data storage, customer data storage, farmland data storage, and statistical data storage may be provided in the server device instead of in the online storage or the like as in the embodiment described above.

In using the values obtained by a satellite positioning system through positioning as position information in the embodiment described above, the evaluation information generating system may perform a correction process on the position information in consideration of the precision of the satellite positioning system.

While the ground area information is determined by the information collector moving around the outer periphery of the ground area in the embodiment described above, the ground area information may be determined by consulting image data based on satellite data and specifying a particular ground area in the image data.

While the evaluation data is generated for a target on the ground (agricultural field) in the embodiment described above, the data may be generated for a target area on a sea surface (e.g., ocean farm).

While the evaluation data is generated for each agricultural field the user owns in the embodiment described above, the data may be generated for each predetermined area (region).

Others

The configurations of the embodiment and variation examples described above may be used in combinations as suited without departing from the technical scope of the present invention. The present invention may also be embodied with some changes added as required without departing from the technical scope thereof.

The invention claimed is:

1. An evaluation information generating system that evaluates a ground area owned by a user, using satellite data observed by an artificial satellite, the system comprising:
a user information acquisition unit configured to acquire user information that is personal information of the user;
a ground area information acquisition unit configured to acquire ground area information including a position of the ground area;
a satellite data acquisition unit configured to acquire the satellite data;
a situation detection unit configured to detect a situation of the ground area on the basis of a plurality of spectral bands of different wavelengths of electromagnetic waves sensed by a sensor of an artificial satellite, which are included in the satellite data; and
an evaluation data generating unit configured to generate evaluation data of the user or the ground area on the basis of the user information, the ground area information, and the situation of the ground area,
wherein the situation of the ground area is a plurality of pieces of ground information including water, soil, and vegetation,
wherein the situation detection unit is further configured to detect situations of the water, soil, and vegetation using different combinations of the spectral bands, and
wherein the evaluation data generating unit is further configured to determine whether or not double cropping is being practiced in the ground area on the basis of temporal change of the situations of the ground area.

2. An evaluation information generating system that evaluates a ground area owned by a user, using satellite data observed by an artificial satellite, the system comprising:
a user information acquisition unit configured to acquire user information that is personal information of the user;
a terminal comprising (1) a ground area information acquisition unit configured to acquire ground area information including a position of the ground area and (2) a satellite positioning system;
a satellite data acquisition unit configured to acquire the satellite data;
a situation detection unit configured to detect a situation of the ground area on the basis of the satellite data; and
an evaluation data generating unit configured to generate evaluation data of the user or the ground area on the basis of the user information, the ground area information, and the situation of the ground area,
wherein the ground area information acquisition unit is further configured to generate the ground area information by obtaining information of a plurality of positions at predetermined time intervals from the satellite positioning system of the terminal that moves around an outer periphery of the ground area, and
wherein the evaluation data generating unit is further configured to determine whether or not double cropping is being practiced in the ground area on the basis of temporal change of the situation of the ground area.

3. The evaluation information generating system according to claim 1, wherein the evaluation data generating unit is further configured to generate evaluation data of the user or the ground area on the basis of a distance between the ground area and a water source in the vicinity of the ground area.

4. The evaluation information generating system according to claim 2, wherein the evaluation data generating unit is further configured to generate evaluation data of the user or the ground area on the basis of a distance between the ground area and a water source in the vicinity of the ground area.

5. The evaluation information generating system according to claim 1, wherein the situation detection unit is further configured to detect a situation of the ground area on the basis of the image data generated on the basis of the satellite data.

6. The evaluation information generating system according to claim 2, wherein the situation detection unit is further configured to detect a situation of the ground area on the basis of the image data generated on the basis of the satellite data.

7. The evaluation information generating system according to claim 5,
wherein the ground area is an agricultural field, and
wherein the situation detection unit is further configured to (1) detect at least one of water, soil, and vegetation as the situation on the basis of the image data, and (2) generate a map indicating a distribution for each the situation.

8. The evaluation information generating system according to claim 6,
wherein the ground area is an agricultural field, and
wherein the situation detection unit is further configured to (1) detect at least one of water, soil, and vegetation as the situation on the basis of the image data, and (2) generate a map indicating a distribution for each the situation.

9. The evaluation information generating system according to claim 1, further comprising:
a meteorological data acquisition unit configured to acquire meteorological data,
wherein the evaluation data generating unit is further configured to generate evaluation data of the user or the ground area on the basis of the meteorological data, the user information, the ground area information, and the situation of the ground area.

10. The evaluation information generating system according to claim 2, further comprising:
a meteorological data acquisition unit configured to acquire meteorological data,
wherein the evaluation data generating unit is further configured to generate evaluation data of the user or the ground area on the basis of the meteorological data, the user information, the ground area information, and the situation of the ground area.

11. The evaluation information generating system according to claim 1,
wherein the evaluation data generating unit is further configured to generate the evaluation data using an artificial intelligence algorithm.

12. The evaluation information generating system according to claim 2, wherein the evaluation data generating unit is further configured to generate the evaluation data using an artificial intelligence algorithm.

13. An evaluation information generating method that evaluates a ground area owned by a user, using satellite data observed by an artificial satellite, the method comprising:
a user information acquisition step of acquiring user information that is personal information of the user;
a ground area information acquisition step of acquiring ground area information including a position of the ground area;
a satellite data acquisition step of acquiring the satellite data;
a situation detection step of detecting a situation of the ground area on the basis of a plurality of spectral bands of different wavelengths of electromagnetic waves sensed by a sensor of an artificial satellite, which are included in the satellite data; and
an evaluation data generating step of generating evaluation data of the user or the ground area on the basis of the user information, the ground area information, and the situation of the ground area,
wherein the situation of the ground area is a plurality of pieces of ground information including water, soil, and vegetation,
wherein in the situation detection step, situations of the water, soil, and vegetation are detected using different combinations of the spectral bands, and
wherein in the evaluation data generating step, whether or not double cropping is being practiced in the ground area is determined on the basis of temporal change of the situations of the ground area.

14. An evaluation information generating method that evaluates a ground area owned by a user, using satellite data observed by an artificial satellite, the method comprising:
a user information acquisition step of acquiring user information that is personal information of the user;
a ground area information acquisition step of acquiring ground area information including a position of the ground area;
a satellite data acquisition step of acquiring the satellite data;
a situation detection step of detecting a situation of the ground area on the basis of the satellite data; and
an evaluation data generating step of generating evaluation data of the user or the ground area on the basis of the user information, the ground area information, and the situation of the ground area,
wherein in the ground area information acquisition step, the ground area information is generated by obtaining information of a plurality of positions at predetermined time intervals from a satellite positioning system of a terminal that moves around an outer periphery of the ground area, and
wherein in the evaluation data generating step, whether or not double cropping is being practiced in the ground area is determined on the basis of temporal change of the situation of the ground area.

15. A non-transitory computer readable medium storing a program for causing a computer to execute each step of the evaluation information generating method according to claim 13.

16. A non-transitory computer readable medium storing a program for causing a computer to execute each step of the evaluation information generating method according to claim 14.

* * * * *